Dec. 9, 1969  M. E. MURPHY  3,482,649
EXHAUST MUFFLER FOR COMBUSTION ENGINES
Filed Sept. 9, 1968
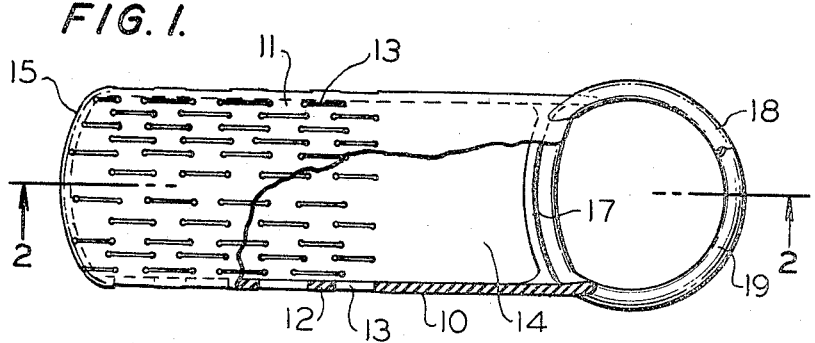
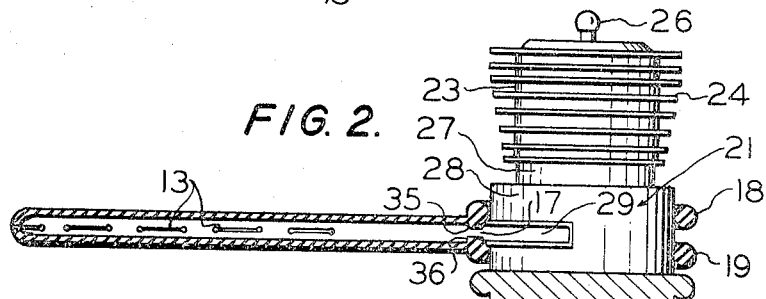
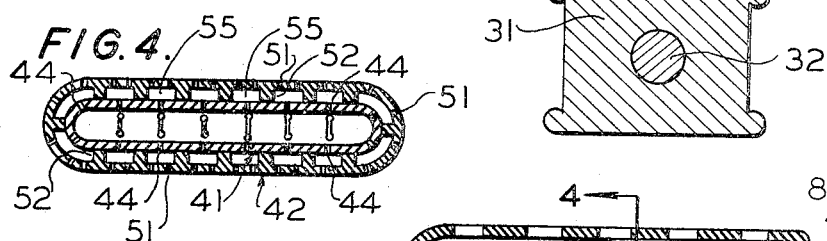
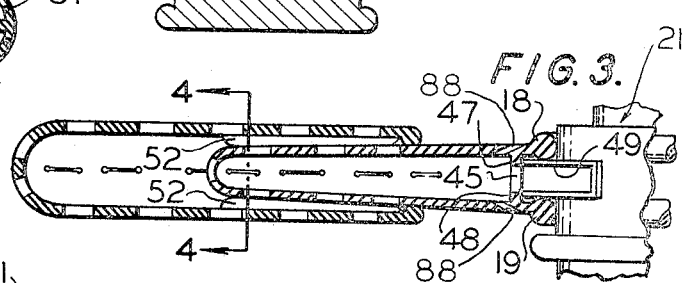
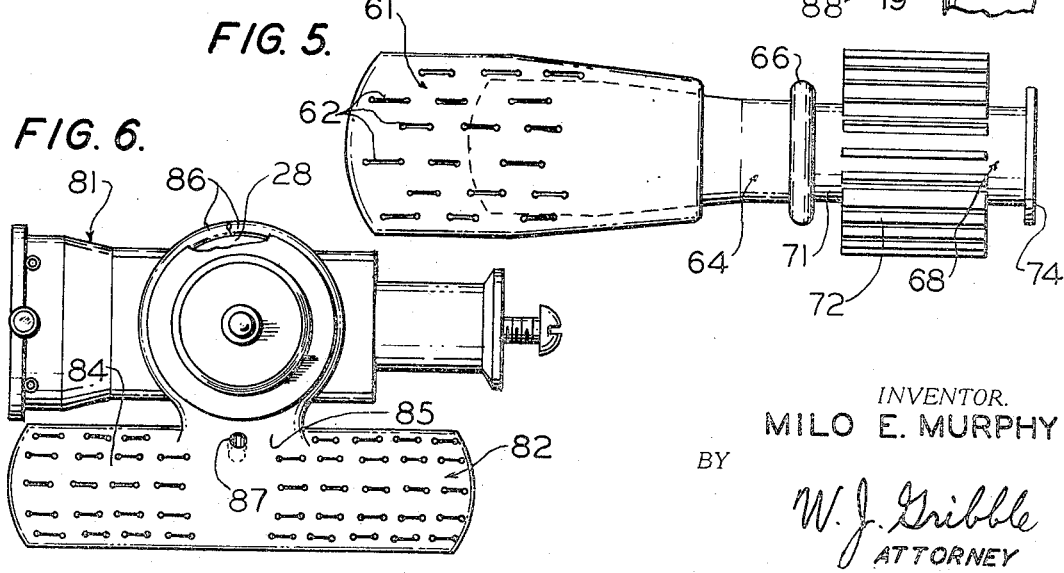
INVENTOR.
MILO E. MURPHY
BY
W. J. Gribble
ATTORNEY

United States Patent Office 3,482,649
Patented Dec. 9, 1969

3,482,649
EXHAUST MUFFLER FOR COMBUSTION ENGINES
Milo E. Murphy, 2299 Ximeno Ave.,
Long Beach, Calif. 90815
Filed Sept. 9, 1968, Ser. No. 758,530
Int. Cl. F01n 7/10, 1/00, 1/08
U.S. Cl. 181—40                                    2 Claims

ABSTRACT OF THE DISCLOSURE

An elastic muffler, preferably of silicone rubber, is connected to the exhaust port of a small gasoline engine. The wall or walls of a muffler envelope away from the exhaust port are slitted or apertured. The envelope and the slits expand as exhaust gas pressure increases and contract as that pressure drops. Two envelopes, one inside another, may be used. An integral loop extends from the envelope about the cylinder of single cylinder engines to secure the envelope to the engine and preserve its connection to the engine exhaust port.

---

Fractional horse power gasoline engine find wide use in miniature hobby craft, such as boats, auto racers and airplanes. The low output of the engines at low revolutions per minute makes high revolutions desirable. High r.p.m.'s result in an unpleasant whine or howl, which interferes with enjoyment of the hobby. Conventional mufflers cause back pressure and reduce the power output in small engines.

Many of the factors set forth above also apply to engines of small vehicles, such as off-highway cycles and carts and some smaller motorcycles.

Brief summary of the invention

The invention contemplates a muffler having an envelope of resilient or elastic material, such as silicone rubber, which is attached to the engine by one or more integral bands that fit tightly about the body of the engine, holding an envelope intake opening in connection with the engine exhaust port. One or more envelope walls has a plurality of elongate apertures distributed generally away from the intake opening. The apertures are adapted to expand and contract as the exhaust pressure rises and falls. The resilient muffler envelope dampens exhaust noise without diminishing power output. No appreciable back pressure results from the suppression of the noise volume by the muffler of the invention.

The envelope may be injection molded and punched or formed from proper rubber tubing by cutting and sealing techniques. It is, therefore, inexpensive to fabricate by existing methods and with conventional machines.

Other advantages of the invention are apparent from the following detailed desciption and drawing in which like parts are designated by like reference numbers.

Brief description of the drawing

FIG. 1 is a plan view, partly in section, of a preferred embodiment of the invention;

FIG. 2 is a sectional elevation of the muffler of FIG. 1 attached to a small engine;

FIG. 3 is a sectional elevation of an alternate embodiment of the invention;

FIG. 4 is a transverse section taken along line 4—4 of FIG. 3;

FIG. 5 illustrates in elevation an alternate attachment means on the muffler; and FIG. 6 is a plan view of a further alternate embodiment of the invention attached to a small engine.

In FIG. 1 a muffler 10 has an elastic envelope 11 with a thin closed wall 12 having a plurality of apertures 13. The wall 12 encloses a volume 14 defined at one end 15 by a wall closure and at the other by an exhaust entry port 17. A pair of spaced loops 18, 19 extend outwardly from the exhaust port to affix the muffler to a small gasoline engine 21.

The gasoline engine is shown in section schematically in FIG. 2. The engine is a conventional one with a cubic displacement of .049 cubic inch, such as made by Cox or other miniature engine manufacturers. The engine has a cylinder 23 with vanes 24 and a spark plug 26. A piston (not shown) resides in the cylinder. The cylinder narrows to a neck 27 and then expands in a housing 28 through the wall of which an exhaust port 29 extends. A lower portion 31 of the housing supports a shaft 32 driven by the piston and connecting conventionally to a propeller (not shown).

The envelope wall is thickened adjacent the exhaust port 17 to form upper and lower beads 35, 36 which abut the housing wall adjacent the exhaust port of the engine. The beads extend into the loop 18, 19 which circle the housing and hold the envelope in place adjacent the exhaust port.

The muffler of FIGS. 1 and 2 is preferably injection molded of a silicone rubber of 30 Shore hardness rating. The apertures may be formed at the time the muffler is molded or any be punched thereafter. Preferably the slits are ⅛ inch to ¼ inch long. Ten slits per pierced square inch of the area of the muffler envelope have proved adequate for a .049 cubic inch displacement engine.

In operation the envelope tends to expand and contract with the pulse of the exhaust gas. When the envelope expands, the slits tend to increase in size, which may be the reason that engine-damping back pressure does not develop using this muffler, in contrast to the use of conventional mufflers.

While the particular type of silicone rubber previously described has performed satisfactorily, other materials of like heat resisting qualities and elasticity may be used to practice the invention. The tube size for the .049 cubic inch displacement engine is approximately ¾ inch x ⅟₁₆ inch in internal dimension and approximately 2½ inches long.

FIGS. 3 and 4 show an alternate embodiment of the invention in which there are inner and outer envelopes. As can be seen in section in FIG. 3, a first envelope 41 is partially covered by a second envelope 42. The first envelope has apertures 13 remote from an exhaust port 45 defined in part by flexible beads 47, 48 against which a rim 49 of the engine exhaust port abuts. Connecting loops 18, 19 secure the muffler to the body of a small engine (not shown).

Second envelope 42 has a plurality of elongate apertures 51. Spacing ribs 52 extend from the inner wall of the second envelope at intervals about the inner periphery. The ribs serve to space the inner surface of the second envelope from the outer surface of the first envelope. Apertures 13 of the first envelope are preferably located such that they open into the gas passages 55 formed between adjacent ribs 52. The second envelope may be fixed to the first by a glue seam 58, or by a heat seal, or the like, depending upon the material of which the elastic or resilient envelopes are made.

While the ribs have been shown as extending from the second envelope, exterior ribs on the first envelope may be used to serve the same purpose.

In FIG. 5 an envelope 61 of silicone rubber has a plurality of elongate apertures 62. Envelope 61 is affixed by convenient means about an inner envelope 64, which, in the manner described for the embodiment of FIGS. 3 and 4, has elongate apertures within the confines of the outer envelope 61.

Envelope 64 terminates in a collar 66 which defines a gas entry port. An adapter 68 is fitted within the entry port. The adapter is essentially cylindrical and has a body 71 from which fins 72 radiate. The body terminates away from the muffler in a coupling collar 74 which affords means for attaching the muffler to the exhaust manifold or port of engines differing in configuration from that shown in FIG. 2. The embodiment of FIG. 5, therefore, is a resilient muffler and heat dissipator unit which has utility with slightly larger internal combustion engines.

FIG. 6 shows a further alternate embodiment of the invention wherein a small engine 81 has attached thereto a resilient muffler 82 which has an apertured envelope 84 with a central neck 85 extending to the gas entry port of the muffler. Loops 86 extend about the engine body to secure the muffler to the engine. The major axis of the muffler of FIG. 6 extends parallel to the shaft of the engine in contrast to the previously described mufflers in which the major axis of the muffler is perpendicular to the extent of the engine shaft. The embodiment of FIG. 6 may be used where the perpendicular muffler orientation might interfere because of the particular usage of the engine.

It has been found that larger engines and engines using relatively lean fuel mixtures engender hotter exhaust gases than do smaller engines and richer fuel mixtures. In order to compensate for hotter gases, silicone rubbers of 40 score or 50 score qualities are used for the muffler envelope material.

The exhaust gases may also be cooled by dilution. Cool air may be introduced into the exhaust stream by means of ducts such as the duct 87 of FIG. 6, entering the muffler interior at an acute angle to the exhaust stream emerging from the engine. The embodiment of FIG. 3 is illustrated with upper and lower ducts 88 for inducing cooler outside air into the muffler as the hot exhaust gases emerge from the engine exhaust port. The size and the number of the cool air ducts may vary from engine to engine, and also vary with the fuel mixture used.

The foregoing description and drawing is illustrative of only a few of the facets of the invention. Many other embodiments will occur to those skilled in the art within the scope of the invention.

I claim:

1. An exhaust gas muffler for a single cylinder combustion engine comprising an elastic tube, a closed end on the tube, an open tube end remote from the closed end, means at the open tube end for connecting the tube to an engine gas exhaust port, apertures in the tube wall each adapted to expand and contract as the pressure of the exhaust gas rises and falls, and a loop extending from the tube adjacent the open end thereof adapted to girdle the engine cylinder to secure the muffler thereto.

2. An exhaust gas muffler for a single cylinder combustion engine comprising an elastic tube, a closed end on the tube, an open tube end remote from the closed end, means at the open tube end for connecting the tube to an exhaust gas exhaust port, apertures in the tube wall each adapted to expand and contract as the pressure of the exhaust gas rises and falls, a metallic duct connecting to the open tube end, heat radiating means on the duct, and coupling means on an end of the duct adapted for attachment to an exhaust manifold.

References Cited

UNITED STATES PATENTS

| 2,859,830 | 11/1958 | Hoffar | 181—47.1 |
| 2,877,860 | 3/1959 | Hoffar | 181—47.1 |
| 2,937,708 | 5/1960 | Cottle. | |

FOREIGN PATENTS 1,224,400   2/1960   France.

ROBERT S. WARD, Jr., Primary Examiner

U.S. Cl. X.R.

181—47, 57, 60, 61